US005462593A

United States Patent [19]

Poppe et al.

[11] Patent Number: 5,462,593
[45] Date of Patent: * Oct. 31, 1995

[54] METHOD OF PRODUCING PROTEIN PRODUCTS FOR BRIGHT PAPER COATING APPLICATIONS

[75] Inventors: George Poppe; Denise Ciesielski, both of Decatur; Mark Matlock, Mt. Zion, all of Ill.

[73] Assignee: Archer Daniels Midland Company, Decatur, Ill.

[*] Notice: The portion of the term of this patent subsequent to Nov. 15, 2011, has been disclaimed.

[21] Appl. No.: 254,950

[22] Filed: Jun. 7, 1994

Related U.S. Application Data

[63] Continuation-in-part of Ser. No. 986,590, Dec. 7, 1992, Pat. No. 5,364,465.

[51] Int. Cl.⁶ ........................................ C08L 89/00
[52] U.S. Cl. ........................ 106/124; 106/148; 106/154.1; 530/370; 530/407; 530/410
[58] Field of Search ................................. 106/124, 148, 106/154.1; 530/407, 410, 370; 162/64, 65, 70, 78, 82

[56] References Cited

U.S. PATENT DOCUMENTS

| | | | |
|---|---|---|---|
| 2,246,466 | 6/1941 | Julian et al. | 530/378 |
| 2,271,620 | 2/1942 | Brier et al. | 106/154.1 |
| 2,274,983 | 3/1942 | Hieronymus | 530/378 |
| 2,331,619 | 10/1943 | Morse | 106/154.1 |
| 2,356,795 | 8/1944 | Poarch | 106/154.1 |
| 2,385,240 | 9/1945 | Ware | 106/154.1 |
| 2,461,404 | 2/1949 | Wormell et al. | 106/154.1 |
| 2,524,991 | 10/1950 | Renner | 106/154.1 |
| 2,887,395 | 5/1959 | Rowe et al. | 106/154.1 |
| 4,035,194 | 7/1977 | Grassl | 106/154.1 |
| 4,036,996 | 7/1977 | Chandler et al. | 426/254 |
| 4,038,437 | 7/1977 | Chandler et al. | 426/656 |
| 4,073,948 | 2/1978 | Chandler et al. | 426/656 |
| 4,132,589 | 1/1979 | Christensen | 162/65 |
| 4,141,996 | 2/1979 | Chandler et al. | 426/44 |
| 4,264,493 | 4/1981 | Battista | 106/154.1 |
| 4,352,692 | 10/1982 | Krinski et al. | 106/614 |
| 4,626,319 | 12/1986 | Kruger et al. | 162/65 |
| 4,636,259 | 1/1987 | Hanaoka | 106/122 |
| 4,687,826 | 8/1987 | Steinmetz et al. | 106/154.1 |
| 4,808,426 | 2/1989 | Strop et al. | 426/417 |
| 4,859,283 | 8/1989 | Jayawant | 162/78 |
| 4,915,785 | 4/1990 | Siminoski et al. | 162/78 |
| 4,961,788 | 10/1990 | Krinski et al. | 106/154.1 |
| 5,364,465 | 11/1994 | Poppe et al. | 106/124 |

*Primary Examiner*—Anthony Green
*Attorney, Agent, or Firm*—Laff, Whitesel, Conte & Saret, Ltd.

[57] ABSTRACT

A modified vegetable protein binder produced by and a method of producing a modified vegetable protein binder for paper coatings by bleaching a vegetable protein extract with an oxidizing agent and a magnesium compound to provide a bleached vegetable protein material and then modifying the bleached vegetable protein. The modification is generally hydrolyzing the bleached vegetable protein and when desired, also carboxylating the bleached vegetable protein.

31 Claims, No Drawings

METHOD OF PRODUCING PROTEIN PRODUCTS FOR BRIGHT PAPER COATING APPLICATIONS

This is a continuation-in-part of our application Ser. No. 07/986,590 filed Dec. 7, 1992, now U.S. Pat. No. 5,364,465.

FIELD OF THE INVENTION

This invention relates generally to vegetable protein binders and, more particularly, to a method of producing modified vegetable protein binders for paper coatings having increased whiteness, brightness and strength.

BACKGROUND OF THE INVENTION

For convenience of expression, the term "extract" is used herein to mean any soluble protein regardless of whether it might more appropriately be called an isolate or a liquor. Also, the term "chemical modification" is used herein to encompass any treatment, such as hydrolysis, carboxylation, precipitation or additional separation, which occurs after the vegetable protein material is extracted and bleached.

Animal and vegetable proteins have been commercially used to make paper coating binders for many years. Casein, an animal protein, has historically played an important role in paper coatings. However, more recently, modified vegetable protein products, especially soy protein, have gained in commercial utilization. Today, modified soybean protein compositions are used as adhesive binders for pigment-containing coatings for paper and paperboard.

Clearly, it is desirable for paper coatings containing these soy protein and pigment compositions to have a bright white finish to contrast with printing inks. However, paper coatings prepared from these soy protein binders exhibit a reduced whiteness, as well as diminished gloss and brightness when compared with casein-containing coating binders.

Therefore, a bleach or oxidizing agent has sometimes been used to enhance the visual characteristics of the soy protein material. However, the process stage in which the soy protein material is treated with the bleach or oxidizing agent may vary depending upon the particular process being employed. For example, U.S. Pat. No. 2,246,466 discloses treating the alkaline extract of a protein with sodium peroxide. In contrast, U.S. Pat. No. 2,274,983 discloses the preparation of protein adhesives through hydrolysis followed by oxidation, wherein the preferred oxidizing agent is hydrogen peroxide. Furthermore, U.S. Pat. No. 4,961,788 discloses treating a carboxylated adhesive protein with an oxidizing material, such as hydrogen peroxide.

Problems arise, however, when the soy protein material is hydrolyzed or carboxylated before it is oxidized. This process allows color bodies to form before the bleach is applied. These color bodies must subsequently be destroyed by using substantial quantities of an oxidizing agent. These problems may be minimized by increasing the effectiveness of the oxidizing agent. However, these problems can be eliminated altogether and the visual characteristics of the final paper coatings can be enhanced if the soy protein material is oxidized with an effective oxidizing agent before any further chemical modification of the protein is performed.

Bleaching technology in the pulp and paper making industry uses peroxides in conjunction with various metal salts, such as magnesium compounds. U.S. Pat. Nos. 4,132,589, 4,626,319, 4,859,283 and 4,915,785 disclose the bleaching of pulp through the use of peroxide and magnesium compounds.

An object of the invention is to provide new and improved methods of producing modified vegetable protein binders for paper coatings having increased whiteness, brightness and strength. Another object is to prepare an oxidizing agent having increased effectiveness that improves the visual characteristics of the final paper coatings. Furthermore, an object is to provide new and novel methods of producing modified vegetable protein binders that prevent the formation of color bodies and enhance the visual characteristics of the final paper coatings. Finally, an object is to provide an economically appealing method of producing modified vegetable protein binders for paper coatings.

SUMMARY OF THE INVENTION

This invention entails a method of producing a modified vegetable protein binder for paper coatings having increased whiteness, brightness and strength by oxidizing a vegetable protein material with an oxidizing agent and a low level of magnesium compound. Additionally, when an isolated vegetable protein material is oxidized with the oxidizing agent and magnesium compound combination before any further chemical treatment, the formation of color bodies is prevented and the visual characteristics of the final paper coatings are further enhanced.

The addition of the low level of magnesium compound with the oxidizing agent, i.e. peroxide, surprisingly and effectively enhances oxidation, thereby improving the whiteness, brightness and strength of the final paper coatings. The present invention thus enhances oxidation, prevents the formation of color bodies, improves the visual characteristics of the paper coatings and is economically appealing.

DETAILED DESCRIPTION OF THE INVENTION

In the practice of the present invention, a vegetable protein material is extracted. Although various vegetable protein materials may be employed, soy protein is preferred for purposes of this invention.

Preferably, a soy protein extract is prepared by treating defatted soybean flakes with an alkaline solution to solubilize the protein and by then separating the dissolved protein from the insoluble components by centrifugation or filtration. The extracted protein material is then oxidized before any further chemical modification or it may be oxidized after being subjected to additional separation.

In a preferred embodiment of the invention, the extracted protein material is oxidized before any further chemical modification. The protein material is preferably oxidized using an oxidizing agent and a magnesium compound. A suitable bleaching combination of hydrogen peroxide, sodium peroxide, calcium peroxide, or ozone and magnesium hydroxide, magnesium sulfate, magnesium carbonate, magnesium oxide, magnesium acetate, or magnesium nitrate may be used. Hydrogen peroxide and magnesium hydroxide are preferred.

The magnesium compound is added to the extracted protein material under agitation. The magnesium compound should be present in the protein material at a level ranging from about 0.025% to 2.5% by weight of protein, and preferably, at a level of about 0.25% to 0.50% by weight of protein.

After the magnesium compound has been added, an oxidizing agent, preferably hydrogen peroxide, is added to the protein material. The peroxide should be added to the protein material at a level ranging from about 0.5% to 10% active peroxide by weight of protein, and preferably, at a level ranging from about 2.5 to 6.0% active hydrogen peroxide by weight of protein.

Oxidizing agents are commonly available in different diluted strengths, such as 50%, 30%, etc. Therefore, the term "active oxidant" refers to only the active agent, or, stated otherwise, the equivalent amount of undiluted oxidant.

The oxidized protein material is then hydrolyzed under strongly alkaline conditions. A suitable alkali is added to produce a pH of 9.0 to 12.5 and the mixture is allowed to react for 15 to 150 minutes at a temperature of from about 30° C. to 80° C. Preferably, sodium hydroxide is added to a pH of about 10.4 to 12.0 and the reaction proceeds for 45 to 90 minutes at a temperature of 55° to 75° C.

The modified protein material may be dried in one of two possible ways. The first method is to acidify the product with a suitable acid compound such as sulfur dioxide and/or sulfuric acid to a pH of about 4.0 to 7.5, then spray dry the acidified product. The second method is to acidify the modified protein material with a suitable acid compound such as sulfur dioxide to a pH of about 6.0 to 7.0, then precipitate the protein with sulfuric acid at a pH of about 4.3. The precipitated modified protein is then separated from the soy whey by filtration or centrifugation. The modified protein curd is then further dewatered by vacuum filtration, followed by oven or tunnel drying.

When desired, prior to acidifying, the hydrolyzed protein material is next carboxylated to improve its adhesive properties as a binder in paper coatings. This improvement is achieved by adding a carboxylic acid anhydride to the hydrolyzed protein material. Some carboxylic acid anhydrides that may be utilized include phthalic, succinic, trimellitic and maleic anhydride. Phthalic anhydride is preferred. The carboxylic acid anhydride should be added to the protein material at a level in the range of about 2 to 10% by weight of protein, and preferably, in the range of about 5 to 8% by weight of protein. The pH at the time of addition of anhydride should be above 9.0, and preferably, between 10.0 and 11.0. The anhydride is allowed to react for 15 to 60 minutes at a temperature of 30° C. to 70° C., and preferably, it is allowed to react for 30 minutes at 60° C.

EXAMPLE 1

Three kilograms of aqueous soy protein extract was obtained having a pH of 9.5, 525 grams of dry solids and providing approximately 315 grams of protein solids. Increase of the temperature of the protein extract to about 70° C. was begun. As the temperature started to rise, 3.2 grams of magnesium hydroxide and 52.5 grams of 30% hydrogen peroxide ($H_2O_2$) were added under agitation. The temperature was allowed to reach 65° to 70° C. At this point, 50.4 grams of 50% sodium hydroxide was added and the hydrolysis was allowed to proceed under agitation at 71° C. for 90 minutes. At this time, heating was discontinued and sulfur dioxide gas was bubbled into the solution until the pH dropped to 7.0. Sulfuric acid (30%) was then added to a pH of 4.3 to precipitate the modified protein material. The precipitated protein curd was then separated from the whey by centrifugation. The protein curd was then washed with an equal weight of water and filtered under vacuum in a Coors funnel through nylon rip-stop cloth to form a filter cake. The protein cake was then pressed through small holes in a metal grill to form "noodles". These noodles were dried in an oven at 60° C. for about 4 hours. The dried noodles (approximately 7% moisture) were then ground into a coarse powder (passes 30-mesh screen) to yield the modified protein binder product.

EXAMPLE 2

The modified protein binder of Example 1 was utilized in paper coatings prepared at 42 percent total solids at 100 parts by weight Kaolin (#1 clay), 14 parts protein, and 157 parts water. The coating was applied to the paper using a drawdown rod size #22. Coated paper samples were allowed to dry overnight at 72° F. and 50% relative humidity. G. E. Brightness and Hunter L.a.b. Brightness paper tests were then conducted at these same conditions. TAPPI 459 su-65 wax standards were also used to measure wax pick, i.e., a measure of the strength of the coating. The test results are illustrated below in Table 1.

TABLE 1

|  | Preferred Paper Coating (Example 2) | ½ Mg & ½ $H_2O_2$ Paper Coating (Example 4) | No Mg & $H_2O_2$ Paper Coating (Example 6) |
| --- | --- | --- | --- |
| G.E. Brightness | 78.62 | 77.38 | 76.02 |
| Hunter L. Brightness | 92.20 | 92.12 | 91.36 |
| Wax Pick | 14 | 14 | 14 |

EXAMPLE 3

The same procedure as described in Example 1 was followed in preparation of a protein binder except that ½ of the magnesium hydroxide (1.6 grams) and ½ of the 30% hydrogen peroxide (26.25 grams) were omitted in its manufacture.

EXAMPLE 4

The same procedure as described in Example 2 was followed, except that the protein binder from Example 3 was used in the paper coating preparation. A comparison of the visual characteristics and pick strength of paper coatings prepared from applicants' protein binder (Example 2) and from a similar protein binder containing ½ the hydrogen peroxide and ½ the magnesium hydroxide (Example 4) is shown above in Table 1.

As illustrated in Table 1 by the G.E. Brightness, Hunter L.a.b. Brightness, and pick strength, the paper coating prepared from applicants' preferred modified protein binder is superior to the paper coating prepared from a protein binder with ½ the magnesium hydroxide and ½ the hydrogen peroxide in terms of whiteness and brightness.

EXAMPLE 5

The same procedure as described in Example 1 was followed in preparation of a protein binder except that the peroxide, hydrogen peroxide, and the magnesium compound, magnesium hydroxide, were omitted in its manufacture.

EXAMPLE 6

The same procedure as described in Example 2 was followed, except that the protein binder from Example 5 was used in the paper coating preparation. A comparison of the visual characteristics and pick strength of paper coatings prepared from applicants' protein binder (Example 2) and from a protein binder which omits both the peroxide and the magnesium compound (Example 6) is shown above in Table 1.

As illustrated in Table 1 by the G. E. Brightness, Hunter L.a.b. Brightness, and pick strength, the paper coatings prepared from both applicants, modified protein binders are superior to the paper coating prepared from a protein binder without hydrogen peroxide and magnesium hydroxide in terms of whiteness and brightness.

The process used to make the products described in Example 1, Example 3, and Example 5 is a laboratory procedure that simulates a "tunnel-dried" commercial product starting from the soy protein extract. An industrial protein product made in this fashion is usually less expensive to produce than a "spray-dried" product. It also has the advantages of lower dusting as well as better water dispersability and better dry-flow properties.

EXAMPLE 7

Dry 90 PDI defatted soy flakes and calcium hydroxide were continuously metered in the correct ratio and fed into a continuous aqueous extraction tank. Conditions and concentrations in the tank were controlled so as to yield an aqueous alkaline protein extract with 2.5% to 5.5% dry solids protein, a pH of 8.8 to 9.8, total dry solids of 5.0% to 15%, and a temperature of about 42° C. to 52° C. when screened at the take-off end of the tank. This protein extract stream was then heated in-line to about 60° C. and pumped into an agitated batch tank to the appropriate level. Then 0.5% magnesium hydroxide by weight of protein and 10.0% by weight of protein of 50% hydrogen peroxide were added to the protein extract in the tank. At this time, 20% by weight of protein of 50% sodium hydroxide was added to the tank under agitation to yield an initial pH of about 11.3. Alkaline hydrolysis was allowed to continue under agitation for 90 minutes at about 60° C. to 65° C. At the end of 90 minutes, heating was discontinued and sulfur dioxide gas bubbled into the solution under agitation until the pH dropped to about 6.5. The contents of the tank were pumped to a "liquor tank" where the pH was adjusted to 4.3 to 4.5 with sulfuric acid to precipitate the modified protein. The precipitated protein slurry from the liquor tank was then pumped to the centrifuges and the modified protein curd was separated from the whey. The modified protein curd was collected in a "wash tank" where it was diluted with water to between 5% and 10% total solids. This diluted protein material from the wash tank was then metered to the vacuum filters, on which the modified protein curd was dewatered to form a modified protein "cake". The cake was collected continuously and pressed through a metal screen to produce modified protein "noodles". The noodles formed in this way were fed continuously onto the moving bed of the tunnel drier (a continuous oven drier). The noodles were dried in the tunnel drier to about 7% to 10% moisture and ground to pass a 30-mesh screen to yield the modified protein binder.

EXAMPLE 8

500g of defatted soybean flakes were extracted at 120° F. for 30 minutes with 4000 g of water under alkaline conditions. The pH was adjusted to a pH of 10 by using calcium hydroxide at the beginning of the extraction process. After 30 minutes, the solubilized protein material was separated from the insoluble material by centrifugation. The insoluble solids were then reextracted with 3000 g of water at 120° F. This second extraction slurry was also centrifuged and separated into an insoluble solid material and a second solubilized protein material. The two protein materials were combined and screened through a 325 mesh screen to yield 5670 grams of protein extract having 5.59% total solids, 3.35% protein, and a pH of 9.0.

As the temperature was increased to 65° C., 0.8 g of magnesium hydroxide and 32 g of 30% hydrogen peroxide were added to the protein extract. When the temperature reached 60°–65° C., 28.5 g of 50% sodium hydroxide were added to yield a pH of about 10.6. Hydrolysis was allowed to occur under these conditions for 45 minutes. Then, 11.4 g of phthalic anhydride were added to the hydrolyzed protein material and allowed to react for 30 minutes. The carboxylated protein material was acidified with sulfur dioxide to a pH of 6.5 and further acidified with 50% sulfuric acid to a pH of 4.5 to complete the precipitation of the modified protein binder. Approximately 1.0 g of Union Carbide Y-12330 defoamer was added to the modified protein binder. The protein binder was then spray dried.

EXAMPLE 9

The dried modified protein binder of Example 8 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G. E. Brightness (TAPPI T452 om-87) and Hunter L.a.b. Whiteness paper tests were then conducted at these same conditions. TAPPI 459 su-65 wax standards were also used to measure wax pick, i.e., a measure of the strength of the coating. The test results are illustrated below in Table 2.

TABLE 2

|  | Inventive Paper Coating (Example 9) | Commercial Paper Coating (Example 10) |
| --- | --- | --- |
| G.E. Brightness | 80.86 | 79.34 |
| Hunter L.a.b. Whiteness | 93.7 | 92.9 |
| Wax Pick | 4 | Heavy 4 |

EXAMPLE 10

The same procedure as described in Example 9 was followed, except that a commercial "bright" protein binder, i.e., Pro-Cote 5000 (from Protein Technologies International) was used in the paper coating preparation. A comparison of the visual characteristics and pick strength of paper coatings prepared from the inventive protein binder (Example 9) and from a conventional protein binder (Example 10) is shown above in Table 2.

As illustrated in Table 2 by the G.E. Brightness, Hunter L.a.b. Whiteness, and pick strength, the paper coating prepared from the inventive modified protein binder is superior to the paper coating prepared from a conventional protein binder in terms of whiteness, brightness and strength.

These coatings are used to cover gray paper stocks and the ability of these coatings to cover the darker colors underneath is of considerable commercial importance. The bright, white background is necessary to contrast with printing inks. A higher G.E. Brightness value indicates a coating that reflects light better. A higher Hunter (L) value indicates a whiter surface. Strength of these coatings is important in their adhesion to the substrate to resist abrasion and detamination since many of these printed surfaces are used on exterior packaging. A higher wax pick value indicates a stronger coating adhesion to the paper. The pick value may also be rated by the amount of coating removed so a "heavy" value indicates more loss of coating.

EXAMPLE 11

4.0 kilograms of unmodified soy curd were obtained having dry solids of 10% and providing approximately 400 grams of protein solids. The pH was raised to 6.5 with a 50% sodium hydroxide solution. Then, 2.0 grams of Union Carbide Y-12330 defoamer, 1.0 gram of magnesium hydroxide and 40.0 grams of 30% hydrogen peroxide ($H_2O_2$) were added under agitation as the temperature was raised to 60° C. At this point, 68 grams of 50% sodium hydroxide were added to yield an initial pH of 11.5 and the hydrolysis was allowed to proceed under agitation at 60° C. for 90 minutes. At this time, 16 grams of phthalic anhydride were added and the mixture was allowed to stir for another 30 minutes at 60° C. At the end of the 30 minutes, heating was discontinued and sulfur dioxide gas was bubbled into the solution until the pH dropped to 6.5. The solution was then passed through a 325 mesh screen and spray dried to produce a dry modified protein binder product.

EXAMPLE 12

The modified protein binder of Example 11 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G.E. Brightness and Hunter L.a.b. Whiteness paper tests were then conducted at these same conditions. TAPPI 459 su-65 wax standards were also used to measure wax pick, i.e., a measure of the strength of the coating. The test results are illustrated below in Table 3.

TABLE 3

|  | Inventive Paper Coating (Example 12) | No Magnesium Paper Coating (Example 14) | No Mg & $H_2O_2$ Paper Coating (Example 16) |
| --- | --- | --- | --- |
| G.E. Brightness | 80.48 | 80.06 | 79.54 |
| Hunter L. Whiteness | 94.0 | 93.9 | 93.62 |
| Wax Pick | 7 | 7 | 6 |
| K & N | 48.4 | 47.74 | 42.8 |

EXAMPLE 13

A protein binder was prepared according to the same procedure described in Example 11, except that the magnesium hydroxide was omitted in its manufacture.

EXAMPLE 14

The same procedure as described in Example 12 was followed, except that the protein binder from Example 13 was used in the paper coating preparation. A comparison of the visual characteristics and pick strength of paper coatings prepared from the inventive protein binder (Example 12) and from a similar protein binder containing hydrogen peroxide but not magnesium hydroxide (Example 14) is shown above in Table 3.

As illustrated in Table 3 by the G.E. Brightness, Hunter L.a.b. Whiteness, and pick strength, the paper coating prepared from the inventive modified protein binder is superior to the paper coating prepared from a protein binder without magnesium hydroxide in terms of whiteness and brightness.

As discussed previously, higher values for the G.E. Brightness and Hunter L.a.b. are important characteristics for commercial paper coatings. The K&N values are indicative of good ink receptivity or printability of the coating. The higher the value, the deeper the ink was able to penetrate and pigment the coating.

K&N is also used as a predictor of the coating's ability to accept a strong glue bond.

EXAMPLE 15

The same procedure as described in Example 11 was followed in preparation of a protein binder, except that hydrogen peroxide and magnesium hydroxide were omitted in its manufacture.

EXAMPLE 16

The same procedure as described in Example 12 was followed, except that the protein binder from Example 15 was used in the paper coating preparation. A comparison of the visual characteristics and pick strength of paper coatings prepared from the inventive protein binder (Example 12) and from a protein binder which does not contain hydrogen peroxide or magnesium hydroxide (Example 16) is shown above in Table 3.

As illustrated in Table 3 by the G. E. Brightness, Hunter L.a.b. Whiteness, and pick strength, the paper coating prepared from the inventive modified protein binder is superior to the paper coating prepared from a protein binder without hydrogen peroxide and magnesium hydroxide in terms of whiteness, brightness and strength.

EXAMPLE 17

9.45 kilograms of alkaline soy extract were obtained having a pH of 9.5, total dry solids of 7.07%, and providing approximately 400 grams of protein solids. 2.0 grams of Union Carbide Y-12330 defoamer, 1.62 grams of magnesium hydroxide and 65.0 grams of 30% hydrogen peroxide ($H_2O_2$) were added under agitation and the temperature was raised to 60° C. At this point, 83 grams of 50% sodium hydroxide was added to yield an initial pH of 11.5 and the hydrolysis was allowed to proceed under agitation at 60° C. for 90 minutes. At this time, 26 grams of phthalic anhydride was added and the mixture was allowed to stir for another 45 minutes at 60° C. At the end of 45 minutes, heating was discontinued and sulfur dioxide gas was bubbled into the solution until the pH dropped to 6.5. The solution was then passed through a 325 mesh screen. Sulfuric acid was added to a pH of 4.4 to precipitate the protein. The precipitated protein was then separated from the whey by centrifugation—yield=960 g of curd. The protein curd was washed with 900 g of water and filtered under vacuum in a Coors funnel through nylon rip-stop cloth to form a filter cake. The protein cake was then pressed through small holes in a metal grill to form "noodles". These noodles were dried in an oven at 60° C. for about 4 hours. The dried noodles (6.7% moisture) were then ground into a powdered modified protein binder product—yield=191 g.

EXAMPLE 18

The modified protein binder of Example 17 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G. E. Brightness and Hunter L.a.b. Whiteness paper tests were then conducted at these same conditions. TAPPI 459 su-65 wax standards were also used to measure wax pick, i.e., a measure of the strength of the coating. The test results are illustrated below in Table 4.

TABLE 4

|  | Inventive Paper Coating (Example 18) |
| --- | --- |
| G.E. Brightness | 79.56 |
| Hunter L.a.b. Whiteness | 93.62 |
| Wax Pick | 8 |

The process used to make the product described in Example 17, and used to make the coating described in Example 18 is a laboratory procedure that simulates a "tunnel-dried" commercial product starting from soy flakes. A product made in this fashion is usually much less expensive to produce than a "spray-dried" product. It also has the advantages of lower dusting as well as better water dispersability and better dry-flow properties. Cold water solubility of this particular oxidized product was also an unexpected benefit.

EXAMPLE 19

Dry 90 PDI defatted soy flakes and calcium hydroxide were continuously metered in the correct ratio and fed into a continuous aqueous extraction tank. Conditions and concentrations in the tank were controlled so as to yield an aqueous alkaline protein extract with 2.5% to 5.5% dry solids protein, a pH of 8.8 to 9.8, total dry solids of 5.0% to 15%, and a temperature of about 42° C. to 52° C. at the take-off end of the tank. This protein extract stream was then heated in-line to about 60° C. and filtered from any insolubles over a 325-mesh screen. Filtered extract was pumped into an agitated batch tank to the appropriate level. Then 0.5% magnesium hydroxide by weight of protein and 11.5% by weight of protein of 50% hydrogen peroxide was added to the protein extract in the tank. At this time, 28% by weight of protein of 50% sodium hydroxide was added to the tank under agitation to yield an initial pH of about 11.8. Alkaline hydrolysis was allowed to continue under agitation for 90 minutes at about 60° C. to 65° C. At the end of 90 minutes, 7.0% phthalic anhydride by weight of protein was added to the tank under agitation. After 30 minutes, heating was discontinued and sulfur dioxide gas was bubbled into the solution under agitation until the pH dropped to about 6.5. The contents of the tank were pumped to a "liquor tank" where the pH was adjusted to 4.3 to 4.5 with sulfuric acid to precipitate the modified protein. The precipitated protein slurry from the liquor tank was then pumped to the centrifuges and the modified protein curd was separated from the whey. The modified protein curd was collected in a "wash tank" where it was diluted with water to between 5% and 10% total solids. This diluted protein material from the wash tank was then metered to the vacuum filters, on which the modified protein curd was dewatered to form a modified protein "cake". The cake was collected continuously and pressed through a metal screen to produce modified protein "noodles". The noodles formed in this way were fed continuously onto the moving bed of the tunnel drier (a continuous oven drier). The noodles were dried in the tunnel drier to about 7% to 10% moisture and ground to pass a 30-mesh screen to yield the modified protein binder.

While the invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of producing a modified vegetable protein binder for paper coatings comprising providing a non-hydrolyzed and non-carboxylated vegetable protein material extract; bleaching the vegetable protein extract with an oxidizing agent and a magnesium compound to provide a bleached vegetable protein material and chemically modifying the bleached vegetable protein material by hydrolyzation and drying.

2. The method of claim 1 in which the vegetable protein is soy protein.

3. The method of claim 1 in which the oxidizing agent is taken from the group consisting of hydrogen peroxide, sodium peroxide, calcium peroxide and ozone.

4. The method of claim 3 in which the oxidizing agent is hydrogen peroxide.

5. The method of either claim 1 in which the magnesium compound is taken from the group consisting of magnesium hydroxide, magnesium sulfate, magnesium carbonate, magnesium oxide, magnesium acetate, and magnesium nitrate.

6. The method of claim 5 in which the magnesium compound is magnesium hydroxide.

7. The method of claim 3 in which the oxidizing agent is from about 0.5 to 10% active oxidant by weight of protein.

8. The method of claim 4 in which the oxidizing agent is from about 3.0 to 6.0% active oxidant by weight of protein.

9. The method of claim 7 in which the level of magnesium compound is from about 0.025% to 2.5% by weight of protein.

10. The method of claim 8 in which the magnesium compound is about 0.25% to 0.50% by weight of protein.

11. The method of claim 2 comprising heating defatted soybean flakes under alkaline conditions with water and separating insoluble components from dissolved protein to provide a soybean protein extract, adding to said soybean extract a mixture of a first and a second compound to provide a bleached protein extract and wherein said second compound is selected from the group consisting of hydrogen peroxide, sodium peroxide, calcium peroxide, and ozone and said first compound is selected from the group consisting of magnesium hydroxide, magnesium sulfate, magnesium carbonate, magnesium oxide, magnesium acetate, and magnesium nitrate; hydrolyzing said bleached extract to provide hydrolyzed protein material; acidifying and precipitating the hydrolyzed protein material with a compound selected from the group consisting of sulfur dioxide, sulfuric acid and mixtures thereof, to provide a precipitated modified protein material; separating the precipitated modified protein material from a whey to provide a modified protein binder; and drying said modified protein binder.

12. The method of claim 11 wherein said first compound is magnesium hydroxide and said second compound is hydrogen peroxide.

13. The method of claim 11 wherein the said hydrolyzed protein material is acidified to a pH of about 4.0 to 7.5 to provide a modified protein binder; and said drying is spray drying.

14. The method of claim 13 wherein said first compound is magnesium hydroxide and said second compound is hydrogen peroxide.

15. The method of claim 2 comprising heating defatted soybean flakes under alkaline conditions with water and separating insoluble components from dissolved protein to provide a soybean protein extract; adding to said soybean extract a suitable acid which precipitates the protein to provide a soy curd dispersion; filtering or centrifuging the said soy curd dispersion to provide an unmodified soy curd separate from a whey; adding water and just enough alkali to the said unmodified soy curd to provide a resolubilized protein material; adding to said resolubilized protein material a mixture of a first and a second compound to provide a bleached protein material and wherein said second compound is selected from the group consisting of hydrogen peroxide, sodium peroxide, calcium peroxide, and ozone and said first compound is selected from the group consisting of magnesium hydroxide, magnesium sulfate, magnesium carbonate, magnesium oxide, magnesium acetate, and magnesium nitrate; hydrolyzing said bleached protein material to provide hydrolyzed protein material; acidifying and precipitating the said hydrolyzed protein material with a compound selected from the group consisting of sulfur dioxide, sulfuric acid and mixtures thereof to provide a precipitated protein material; separating the precipitated protein material from the whey to provide a modified protein binder; and drying said modified protein binder.

16. The method of claim 15 wherein said first compound is magnesium hydroxide and said second compound is hydrogen peroxide.

17. The method of claim 15 wherein the said hydrolyzed protein material is acidified to a pH of about 4.0 to 7.5 to provide a modified protein binder.

18. The method of claim 17 wherein said first compound is magnesium hydroxide and said second compound is hydrogen peroxide.

19. The method of claim 2 comprising heating defatted soybean flakes under alkaline conditions with water and separating insoluble components from dissolved protein to provide a soybean protein extract; adding to said soybean extract a suitable acid which precipitates the protein to provide a soy curd dispersion; filtering or centrifuging the said soy curd dispersion to provide an unmodified soy curd separate from a whey; adding water and just enough alkali to the said unmodified soy curd to provide a resolubilized protein material; adding to said resolubilized protein material a mixture of a first and a second compound to provide a bleached protein material and wherein said second compound is selected from the group consisting of hydrogen peroxide, sodium peroxide, calcium peroxide, and ozone and said first compound is selected from the group consisting of magnesium hydroxide, magnesium sulfate, magnesium carbonate, magnesium oxide, magnesium acetate, and magnesium nitrate; hydrolyzing said bleached protein material to provide hydrolyzed protein material; carboxylating the said hydrolyzed protein material with a carboxylic acid anhydride to provide a carboxylated protein material; acidifying and precipitating the carboxylated protein material with a compound selected from the group consisting of sulfur dioxide, sulfuric acid and mixtures thereof to provide a precipitated protein material; separating the precipitated protein material to provide a modified protein binder; and drying said modified protein binder.

20. The method of claim 19 wherein said first compound is magnesium hydroxide and said second compound is hydrogen peroxide.

21. The method of claim 20 wherein the carboxylic acid anhydride is phthalic anhydride.

22. The method of claim 19 wherein the said carboxylated protein material is acidified to a pH of about 4.0 to 7.5 to provide a modified protein binder; and said drying is spray drying.

23. The method of claim 21 wherein said first compound is magnesium hydroxide and said second compound is hydrogen peroxide.

24. The method of claim 22 wherein the carboxylic acid anhydride is phthalic anhydride.

25. A modified vegetable protein binder for paper coatings produced by oxidizing a vegetable protein material with hydrogen peroxide and magnesium hydroxide.

26. A modified vegetable protein paper coating binder comprising a vegetable protein which has first been oxidized by first and second compounds to provide an oxidized vegetable protein and then said oxidized vegetable protein is hydrolyzed, and wherein said first compound is selected from the group consisting of magnesium hydroxide, magnesium sulfate, magnesium oxide, magnesium acetate, and magnesium nitrate and said second compound is selected from the group consisting of hydrogen peroxide, sodium peroxide, calcium peroxide and ozone.

27. The binder of claim 26 wherein said first compound is magnesium hydroxide and said second compound is hydrogen peroxide.

28. The binder of claim 26 wherein said oxidized vegetable protein is hydrolyzed.

29. The binder of claim 28 wherein said first compound is magnesium hydroxide and said second compound is hydrogen peroxide.

30. The binder of claim 26 wherein said oxidized vegetable protein is hydrolyzed and carboxylated.

31. The binder of claim 30 wherein said first compound is magnesium hydroxide and said second compound is hydrogen peroxide.

* * * * *